United States Patent
Higuchi

(10) Patent No.: US 7,437,436 B2
(45) Date of Patent: Oct. 14, 2008

(54) SERVER, DEVICE, CLIENT, INFORMATION PROCESSING METHOD OF SERVER, INFORMATION PROCESSING METHOD OF DEVICE, INFORMATION PROCESSING METHOD OF CLIENT, INFORMATION PROCESSING PROGRAM, AND MEMORY MEDIUM

(75) Inventor: Yuichi Higuchi, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 773 days.

(21) Appl. No.: 09/774,694

(22) Filed: Feb. 1, 2001

(65) Prior Publication Data

US 2001/0029551 A1 Oct. 11, 2001

(30) Foreign Application Priority Data

Feb. 4, 2000 (JP) .............................. 2000-027864

(51) Int. Cl.
G06F 15/173 (2006.01)
(52) U.S. Cl. ........................ 709/223; 709/203; 709/219; 358/1.1; 358/1.15
(58) Field of Classification Search ................ 709/203, 709/217, 223–226, 219; 358/1.1, 1.15–1.17
See application file for complete search history.

(56) References Cited

U.S. PATENT DOCUMENTS

| 5,323,393 | A | * | 6/1994 | Barrett et al. ............... 370/449 |
| 5,580,177 | A | * | 12/1996 | Gase et al. .................... 400/61 |
| 5,815,722 | A | * | 9/1998 | Kalwitz et al. .............. 717/178 |
| 5,832,298 | A | * | 11/1998 | Sanchez et al. ................ 710/8 |
| 6,003,069 | A | * | 12/1999 | Cavill ......................... 709/205 |
| 6,043,898 | A | * | 3/2000 | Jacobs ....................... 358/1.15 |
| 6,327,051 | B1 | * | 12/2001 | Moro et al. ................... 358/1.9 |
| 6,369,907 | B1 | * | 4/2002 | Aoki ......................... 358/1.15 |
| 6,407,823 | B1 | * | 6/2002 | Aoki ......................... 358/1.15 |
| 6,424,424 | B1 | * | 7/2002 | Lomas et al. .............. 358/1.14 |
| 6,452,692 | B1 | * | 9/2002 | Yacoub ...................... 358/1.15 |
| 6,542,892 | B1 | * | 4/2003 | Cantwell ..................... 707/10 |
| 6,614,546 | B1 | * | 9/2003 | Kurozasa ................... 358/1.15 |
| 6,633,400 | B1 | * | 10/2003 | Sasaki et al. ............... 358/1.15 |
| 6,804,019 | B2 | * | 10/2004 | Shiohara ................... 358/1.15 |
| 6,862,103 | B1 | * | 3/2005 | Miura et al. ............... 358/1.15 |

FOREIGN PATENT DOCUMENTS

JP 08003839 * 7/1997
JP 2002215348 A * 2/2002

OTHER PUBLICATIONS

W. Yeong, et al., LDAP (Light Weight Directory Access Protocol), RFC (Request for Comments) 1777, issued by IEFE (Internet Engineering Task Force), ISODE Consortium, Mar. 1995.

* cited by examiner

*Primary Examiner*—Lashonda T Jacobs
(74) *Attorney, Agent, or Firm*—Fitzpatrick, Cella, Harper & Scinto

(57) ABSTRACT

A server obtains an adaptivity of a selectable device for a device retrieval condition from a client and sends it to the client. The client presents the adaptivity to the user, thereby enabling the user to freely select a desired device among a plurality of devices which conform with the retrieval condition.

27 Claims, 16 Drawing Sheets

| 401 | NM  | LBP1110      | MFP6550      | LBP3310      |
|-----|-----|--------------|--------------|--------------|
| 402 | ADD | 111.22.33.44 | 111.22.33.45 | 111.22.33.46 |
| 403 | DV  | PRINTER      | MFP          | PRINTER      |

FIG. 5

| | | |
|---|---|---|
| 501 | RETRIEVAL CONDITION | |
| 502 | DUPLEX PRINT | ON/OFF |
| 503 | N-UP PRINT | 2/4/6 |
| 504 | JOB COPY | 1—999 |
| 505 | PAGE COPY | 1—999 |
| 506 | OHP INSERT | ON/OFF |
| 507 | RESOLUTION | 300/600 |
| 508 | PAGE NO. | 1—999 |
| 509 | PAPER SIZE | A5—A3 |

| | ITEM | ABILITY INFO |
|---|---|---|
| 1101 | DUPLEX | AVAILABLE |
| 1102 | N-UP | UNAVAILABLE |
| 1103 | JOB COPY | AVAILABLE |
| 1104 | PAGE COPY | 999 |
| 1105 | SIZE | A4 |
| 1106 | OHP | UNAVAILABLE |
| 1107 | RESOL | 300/600 |

FIG. 10

| ITEM | ABILITY INFO |
|---|---|
| 1101 DUPLEX | UNAVAILABLE |
| 1102 N-UP | AVAILABLE |
| 1103 JOB COPY | AVAILABLE |
| 1104 PAGE COPY | AVAILABLE |
| 1105 SIZE | A4 |
| 1106 OHP | AVAILABLE |
| 1107 RESOL | 300/600 |

FIG. 11

| ITEM | ABILITY INFO |
|---|---|
| 1101 DUPLEX | AVAILABLE |
| 1102 N-UP | DRIVER |
| 1103 JOB COPY | 10 |
| 1104 PAGE COPY | 999 |
| 1105 SIZE | A4 |
| 1106 OHP | DRIVER |
| 1107 RESOL | 300/600 |
| 1108 ERROR | NO |

FIG. 12

| 1201 | 1202 | 1203 |
|---|---|---|
| 8/8 | 4 PAGES OHP INSERT | D |
| ADAPTIVITY | EXTEND INFO | TYPE OF EXTEND |

FIG. 13

| RETRIEVAL RESULTS | ADAPTIVITY EXTEND |
|---|---|

1301a
| LBP1110 |

1302a
| 100 | D | 4 PAGES |
|---|---|---|
|  | D | OHP INSERT |

1301b
| MFP6550 |

1302b
| 90 | E | DUPLEX |

1301c
| LBP3310 |

1302c
| 60 | W | JAM |

FIG. 24

MEMORY MAP OF MEMORY MEDIUM
(FD/CD-ROM ETC.)

| DIRECTORY |
|---|
| 1ST DATA PROCESSING PROGRAM<br>PROGRAM CODES FOR FLOWCHART OF FIGS. 15, 16 & 19 |
| 2ND DATA PROCESSING PROGRAM<br>PROGRAM CODES FOR FLOWCHART OF FIGS. 17, 20 & 21 |
| 3RD DATA PROCESSING PROGRAM<br>PROGRAM CODES FOR FLOWCHART OF FIG. 18 |
| 4TH DATA PROCESSING PROGRAM<br>PROGRAM CODES FOR FLOWCHART OF FIG. 23 |
| |

SERVER, DEVICE, CLIENT, INFORMATION PROCESSING METHOD OF SERVER, INFORMATION PROCESSING METHOD OF DEVICE, INFORMATION PROCESSING METHOD OF CLIENT, INFORMATION PROCESSING PROGRAM, AND MEMORY MEDIUM

BACKGROUND OF THE INVENTION

1. Field of the Invention

The invention relates to a network system in which a server, a device, and a client communicate with each other through a predetermined communication medium and execute data processes. More particularly, the invention relates to the server, device, and client in the network system, a data processing method of the server, a data processing method of the device, and a data processing method of the client.

2. Related Background Art

Hitherto, a method called a directory service has been provided as a method whereby a computer of the user efficiently finds out and uses various resources (printer, server, scanner, and the like) connected to a network.

The directory service is, so to speak, a phone book regarding the network and used for storing various information. As a specific example of a directory system using the directory service, for instance, there is an LDAP (Light Weight Directory Access Protocol). The regulations of the LDAP have been disclosed in RFC (Request For Commits) 1777 as a standard issued by IETF (Internet Engineering Task Force).

As a manual of the LDAP, for example, "LDAP Internet Directory Application Programming" has been issued by Plentice Hall Co., Ltd. on Nov. 1, 1997.

A computer of the user retrieves the devices connected to, for example, the network by using the directory service, so that it can obtain a list of network addresses of the devices which can be used on the network.

SUMMARY OF THE INVENTION

In the above conventional method, however, when considering a network printer as an example, if various function conditions such as 2-page printing mode (mode to print two pages onto one sheet of paper), OHP inserting mode, duplex mode, stapling, paper size, and the like are designated and a retrieval is performed, the function conditions and ability information of the devices are compared, and only the devices in which they perfectly coincide are retrieved or inadaptivity items of the devices in which they do not perfectly coincide are notified.

The invention is made to solve the above problem and it is an object of the invention to provide a server, a client, a device, a data processing method of the server, a data processing method of the client, a data processing method of the device, and a memory medium, in which devices connected to a network and ability information of device drivers are combined and registered as abilities of the devices into the server, thereby presenting adaptivities of the selectable devices according to a device retrieval condition from the client to the user, widening a selection range of the devices which can be selected by the user in the whole system, and enabling the user to freely select a desired device from a plurality of devices which conforms with the retrieval condition.

BRIEF DESCRIPTION OF THE DRAWINGS

FIG. 4 is a diagram for explaining address information and attribute information of each of the devices which are managed by the server shown in FIG. 2;

FIG. 5 is a diagram showing values which can be used as items serving as a retrieval condition in case of retrieving from the client shown in FIG. 2;

FIG. 10 is a diagram showing ability information of a device driver which is managed by the server shown in FIG. 2;

FIG. 11 is a diagram showing ability information in which the ability information possessed by the device shown in FIG. 1 and the ability information of the device driver are combined;

FIG. 12 is a diagram showing an example of a format showing adaptivity results which are sent from the server to the client shown in FIG. 2;

FIG. 13 is a diagram showing an example of a retrieval result informing screen which is displayed to the client shown in FIG. 2;

FIG. 24 is a diagram for explaining a memory map of a memory medium for storing various data processing programs which can be read out by a network system including the server, client, device, and the like according to the invention.

DETAILED DESCRIPTION OF THE PREFERRED EMBODIMENTS

An explanation will now be made hereinbelow with respect to an embodiment of a server, a client, and a device on a network, a device retrieval system (network system comprising the server, client, and device), a data processing method of the server, a data processing method of the client, a data processing method of the device, and a memory medium according to the invention with reference to the drawings.

Figure 1:
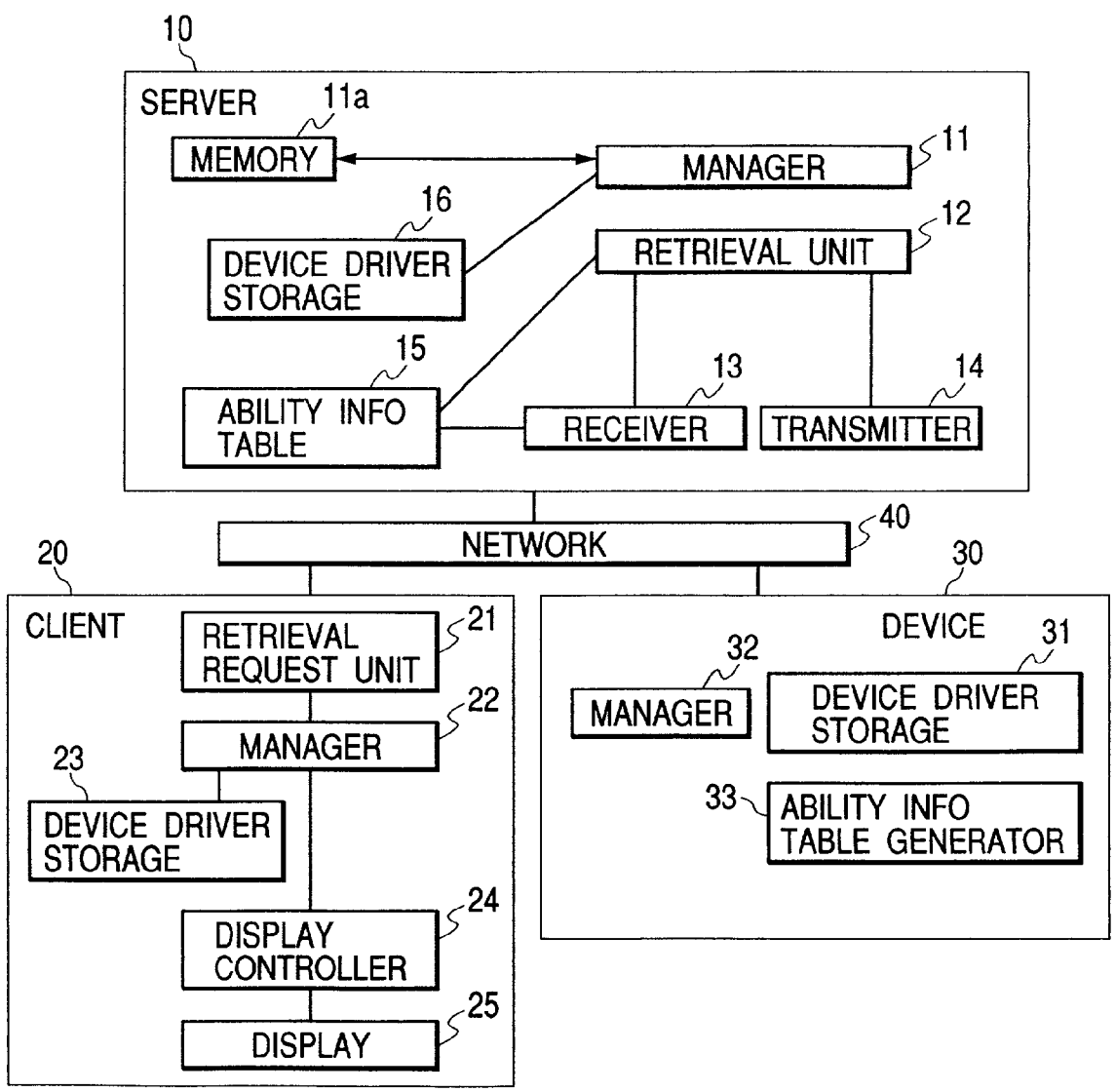
FIG. 1 is a block diagram for explaining a construction of a network system to which a server, a client, and a device can be applied and which shows an embodiment of the invention.

FIG. 1 is a block diagram for explaining a construction of the network system which is realized by the server, client, and device and shows an embodiment of the invention.

In FIG. 1, a server 10 which functions as a retrieval server, a client 20, and a device 30 are connected to a network 40 such as Ethernet, USB, or the like, thereby constructing the network system. The device 30 is, for example, an information processing apparatus such as printer, facsimile, scanner, or the like and, usually, a plurality of devices 30 are connected.

In the embodiment, a workstation is used as a server 10 and has: a manager 11; a memory 11a for performing an arithmetic operation and storing information; a retrieval unit 12; a receiver 13; a transmitter 14; an ability information table 15; and a device driver storage 16.

The manager 11 manages devices connected to the network 40 by the ability information table 15 in which connection information and ability information of the device 30 have been stored, manages a device driver of the connected device, and downloads the device driver in response to a request from the client. Further, when an inquiry regarding the ability information of the device driver is received from the device 30, the manager 11 returns the ability information of the device driver.

The device driver is a program which is executed by the server and client and is used for controlling the device. For example, a printer driver as an example of the device driver receives document data from a document generating program or a graphics forming program which is executed by the client and converts the document data into print data which can be processed by the device. If a printer does not have an N-up printing function, the printer driver generates print data so that N pages of the document data are allocated to one page of the print data.

The receiver 13 receives a retrieval request from the client 20. The retrieval unit 12 compares the retrieval request received by the receiver 13 with the ability information of each device connected to the network 40 through the ability information table 15, thereby calculating an adaptivity between each device and the retrieval condition. The adaptivity is sent through the transmitter 14 to the client 20 or the like to which the retrieval request has been issued.

The ability information of each device connected to the network 40 has been stored in the ability information table 15 at the time of connection of the device or the turn-on of a power source. When the ability information is changed due to the updating of the device driver, it is also restored.

The device driver storage 16 stores the driver of the device connected to the network 40 as necessary. By previously storing the device driver into the server 10, a service for presenting the driver in the case where the client 20 does not have the driver of the adapted device 30 can be performed.

A personal computer is used as a client 20 and has: a retrieval request unit 21; a manager 22; a device driver storage 23; a display controller 24; and a display 25.

In the client 20, the retrieval request unit 21 requests the server 10 to retrieve all of the devices which can be used on the network 40 including the device 30.

The manager 22 holds a result of the retrieval request. When results regarding all of the devices are obtained, the manager 22 notifies the display controller 24 of them. When an inquiry about the ability information of the device driver is received from the device 30, the manager 22 returns the ability information of the driver.

The device driver storage 23 is means for storing the driver for using the device connected to the network 40. The display controller 24 sequentially displays adaptivity results onto a screen of the display 25 in the order from the high adaptivity on the basis of the adaptivity results notified from the manager 22.

The device 30 has a device driver storage 31, a manager 32, and an ability information table generator 33. When the device 30 is connected to the network 40, the ability information table is sent to the server 10.

In the device 30, the manager 32 updates the device driver and sends the ability information table to the server 10. It will be obviously understood that they can be integratedly constructed by a CPU, an MPU, a memory, and the like.

The ability information table generator 33 obtains the sum of the ability information of the device 30 and the ability information of the device driver at the time of power-on, thereby generating an ability information table.

When no device driver exists in the device 30, whether the driver of the device 30 exists in the server 10 or client 20 or not is confirmed. If it exists, the ability information is obtained and an ability information table is generated on the basis of the obtained ability information and the ability information of the device 30.

Each function of a device retrieval system of the embodiment constructed as mentioned above will now be described in detail hereinbelow.

Figure 2:
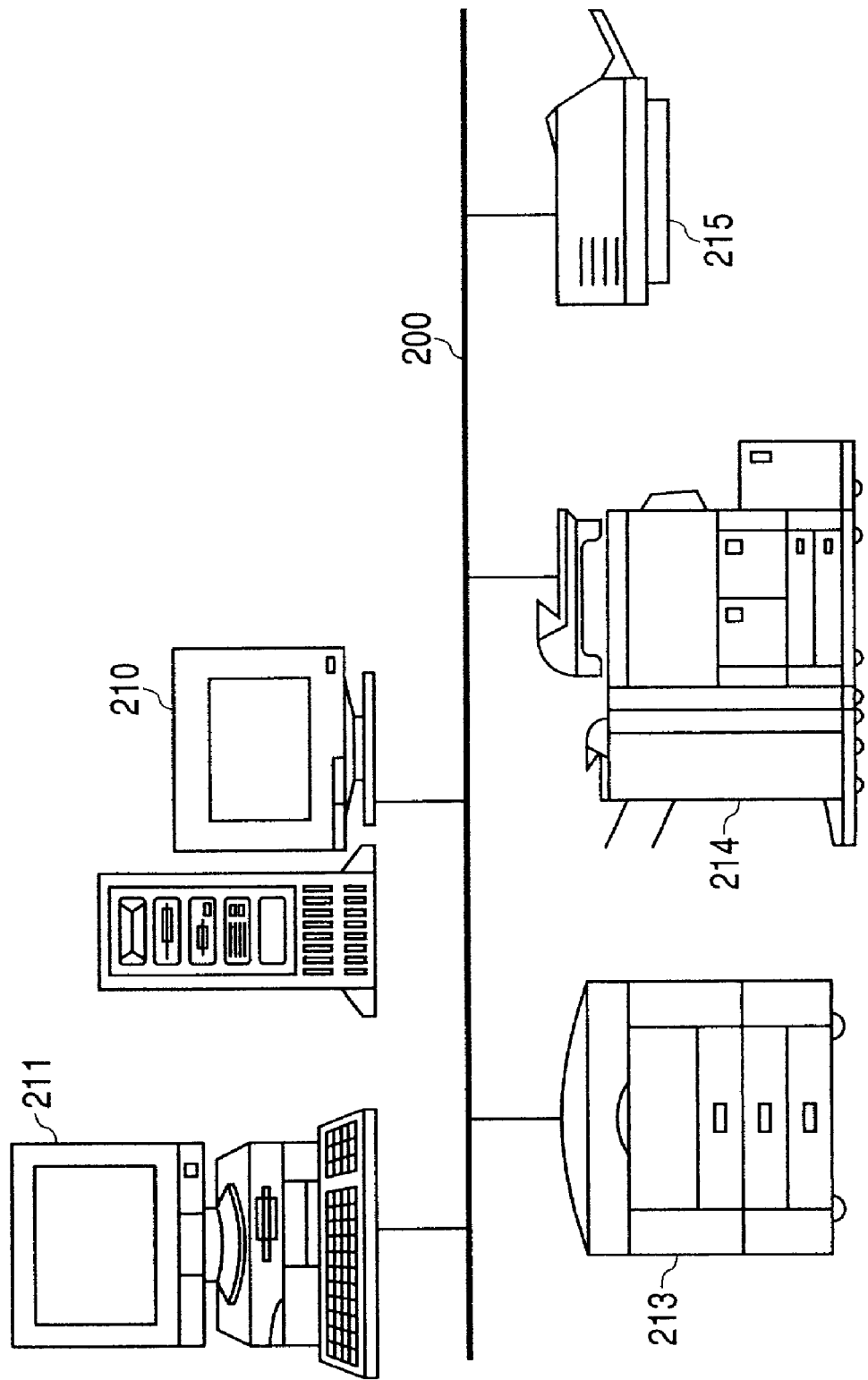
FIG. 2 is a diagram showing a specific construction of a network on which a device retrieval system to which the network system shown in FIG. 1 can be applied can operate.

FIG. 2 is a diagram showing a specific construction of a network on which the device retrieval system to which the network system shown in FIG. 1 has been applied can operate.

In FIG. 2, reference numeral 213 denotes a color printer (color LBP); 214 an MFP (Multi Function Peripheral; although it is a copy machine, it can be used also as a network color printer, a scanner, or a facsimile); and 215 a monochromatic printer.

Reference numeral 211 denotes a desktop PC (client). It is a PC (personal computer) which can execute a program of a network client. The desktop PC 211 is connected to a network 200 as a client mentioned above. As will be explained hereinlater, the desktop PC 211 has not only a function for issuing inquiry information regarding the device which satisfies desired conditions to the server connected on the network 200 but also a function for displaying retrieval results.

Reference numeral 210 denotes a workstation (WS) which can execute a program of the network server in the embodiment. The workstation (WS) 210 is connected as a server mentioned above to the network 200. As will be explained hereinlater, various information regarding the network devices 213 to 215 has been stored in the WS 210. The WS 210 has a function for receiving a device retrieval inquiry from the client 211 connected to the network 200 and returning its result.

Figure 3:
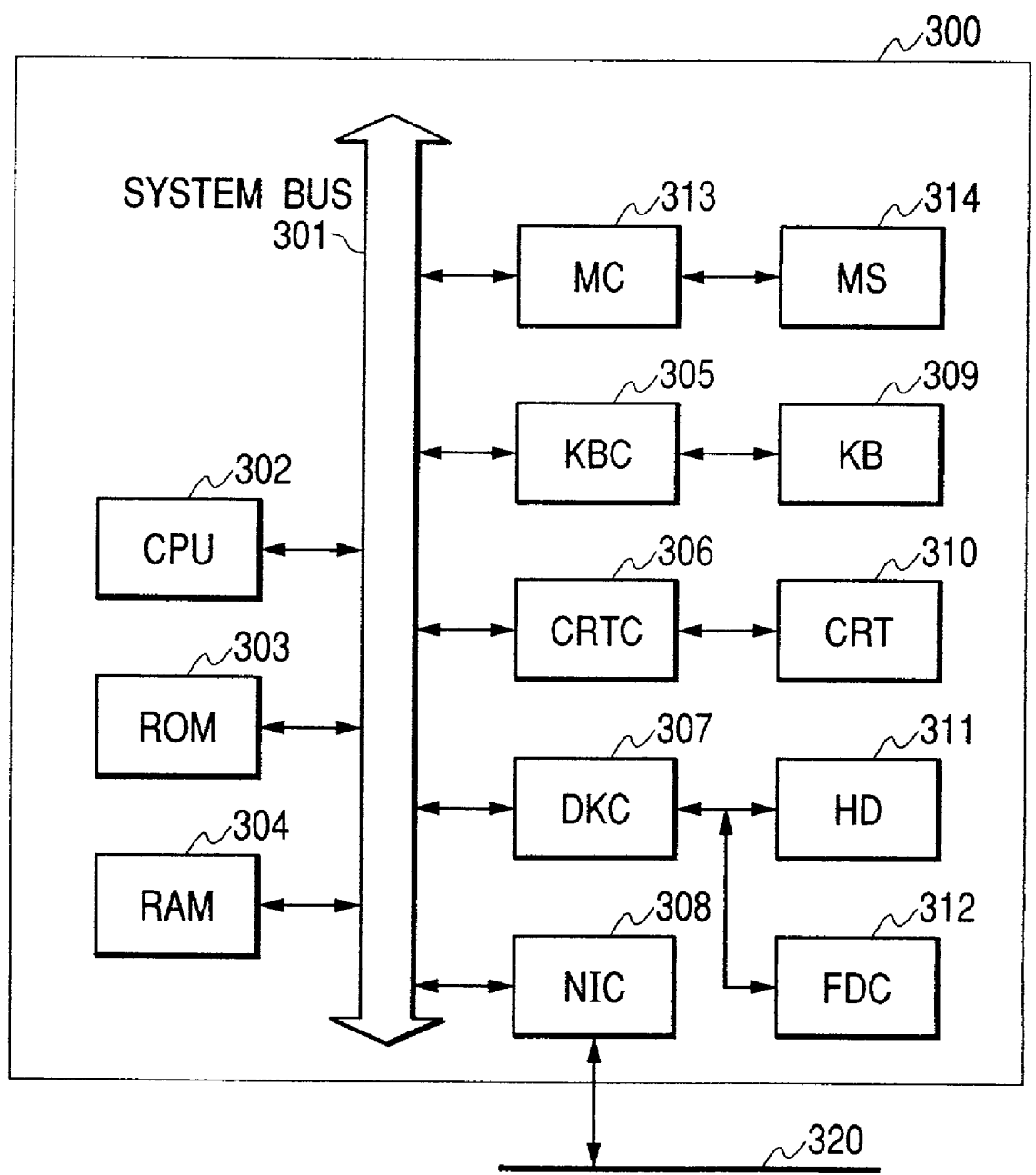
FIG. 3 is a schematic constructional block diagram showing an internal construction of a general personal computer.

FIG. 3 is a schematic constructional diagram showing an internal construction of a general personal computer. A fundamental internal construction of each of the desktop PC 211, server 210, and the like in FIG. 2 is as shown in the diagram.

In FIG. 3, reference numeral 300 denotes a PC or WS on which client software or network server software (hereinafter, they are collectively called network device retrieval software)

operates. The PC/WS 300 is substantially equivalent to the desktop PC 211 or server 210 in FIG. 2.

The PC 300 has a CPU 302 for executing the network device retrieval software which has been stored in an ROM 303 or a hard disk (HD) 311 or is supplied from a floppy disk controller (FDC) 312. The PC 300 integratedly controls the devices connected to a system bus 301.

Reference numeral 304 denotes an RAM which functions as a main memory, a work area, or the like of the CPU 302; 305 a keyboard controller (KBC) for controlling an input of an instruction from a keyboard (KB) 309; and 306 a CRT controller (CRTC) for controlling a display of a CRT display (CRT) 310.

Reference numeral 307 denotes a disk controller (DKC) for controlling accesses to the hard disk (HD) 311 for storing a boot program, various applications, an edit file, a user file, a network management program, and the like and to the floppy disk controller (FDC) 312.

Reference numeral 308 denotes a network interface card (NIC) for bidirectionally transmitting and receiving data to/from a network printer, another network apparatus, or another PC through an LAN 320.

Reference numeral 313 denotes a mouse controller (MC) for controlling a mouse (MS) 314. In the embodiment, the LAN 320 corresponds to the LAN 200 in FIG. 2.

Figure 14:
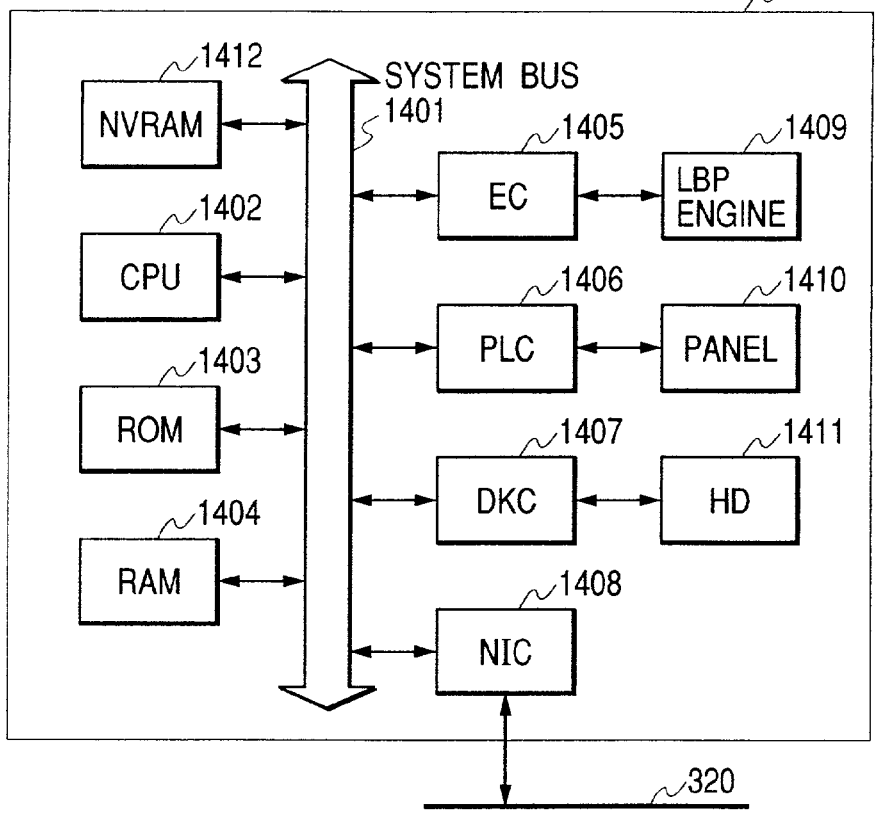
FIG. 14 is a block diagram showing an internal construction of a color printer shown in FIG. 2.

FIG. 14 is a block diagram showing an internal construction of the color LBP 213 shown in FIG. 2.

As shown in FIG. 14, in the color LBP 213, a CPU 1402 for processing a program, an ROM 1403 in which the program has been stored, and an RAM 1404 serving as a work area or a buffer area of the program are connected to a system bus 1401.

Reference numeral 1405 denotes an LBP engine controller (EC). An engine (LBP Engine) 1409 is connected through the controller 1405. Reference numeral 1406 denotes a panel controller (PLC) for controlling input/output to/from a panel (PAENL) 1410 and managing the panel 1410.

The color LBP 213 in the embodiment has a hard disk (HD) 1411 and can temporarily spool print data into the hard disk (HD) 1411, thereby making it possible to cope with a jobcopy.

Reference numeral 1407 denotes a disk controller for managing the HD 1411, and 1408 indicates a network interface controller (NIC). The color LBP is connected to the network 320 through the NIC 1408.

Reference numeral 1412 denotes a non-volatile RAM (NVRAM) which can hold data even if a power source of the printer 213 is turned off. In the embodiment, although layer type position information, attribute information, and the like are held in the NVRAM 1412, those information can be also held in the HD 1411 instead of the NVRAM 1412.

FIG. 4 is a diagram 400 for explaining address information and attribute information of each device which is managed by the server 210 shown in FIG. 2. In the embodiment, the address information, attribute information, and the like of each device are totally called device information and, further, it is assumed that data which can be managed is included as necessary.

As shown in FIG. 4, in the embodiment, three devices are managed in total. In each device, information such as device name (NM) 401, IP address (ADD) 402 as a network address of the device, and kind of device (DV) 403 is managed. For example, in case of the device whose name is "LBP1110", the IP address is "111.22.33.44" and the kind of device is "printer".

FIG. 5 is a diagram showing values which can be used every item serving as a retrieval condition in case of retrieving from the client 211 shown in FIG. 2. For example, in an item 502, whether a duplex print is designated (ON) or not (OFF) can be selected. In an item 503, one of a 2-up print (two pages are printed onto one sheet of paper), a 4-up print (four pages are printed onto one sheet of paper), and a 6-up print (six pages are printed onto one sheet of paper) can be designated. In an item 504, how many jobs are copied can be designated. In an item 505, how many pages are copied can be designated. In an item 506, whether an OHP insertion print is designated (ON) or not (OFF) can be selected. In an item 507, a resolution can be designated. In an item 508, the number of pages can be designated. In an item 509, one of the paper sizes A5, A4, and A3 can be designated.

In the client 211, the user can input a retrieval condition in a set range with respect to the items 502 to 509.

Figure 6:
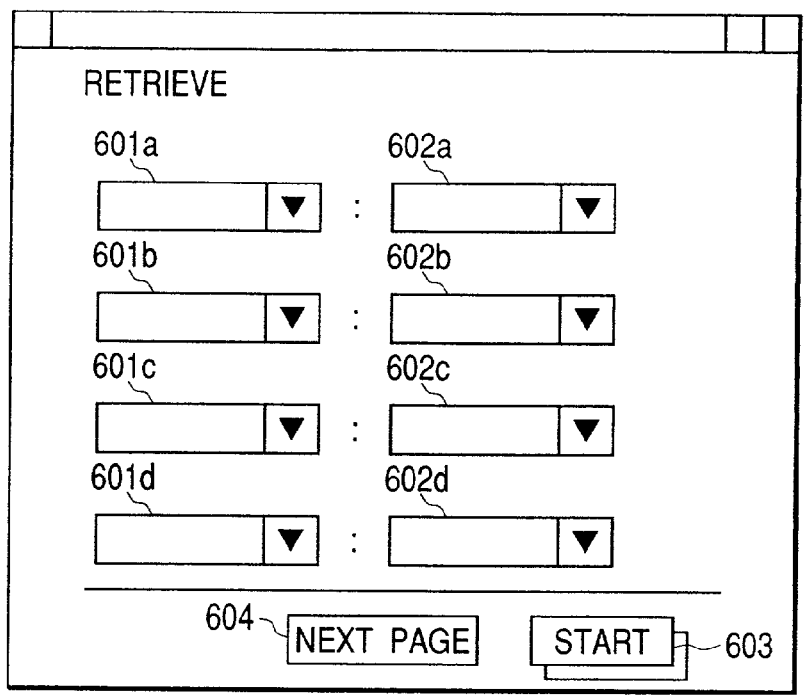
FIG. 6 is a diagram showing a retrieval condition input screen in case of retrieving from the client shown in FIG. 2.
Figure 7:
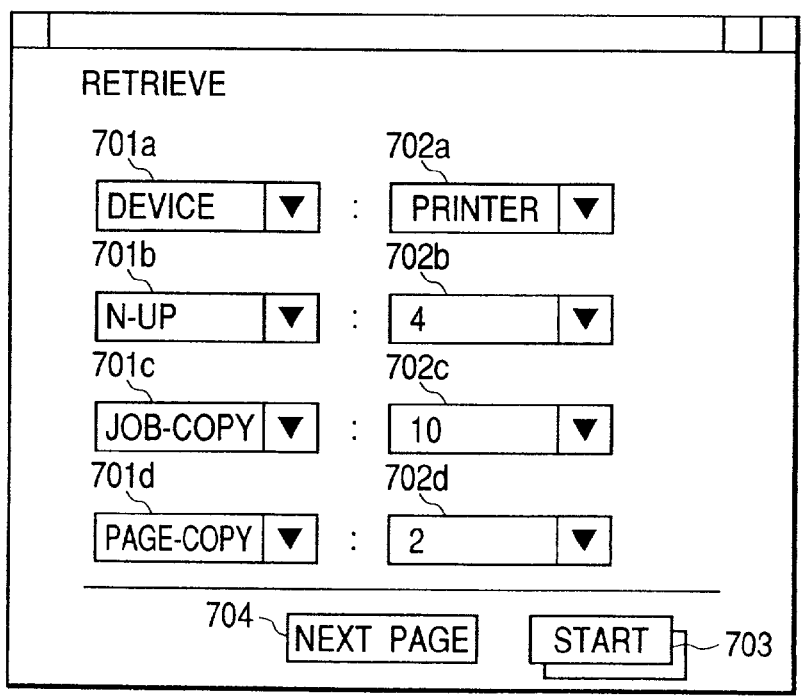
FIG. 7 is a diagram showing a retrieval condition input screen in case of retrieving from the client shown in FIG. 2.

FIGS. 6 and 7 are diagrams each showing a retrieval condition input screen in case of retrieving from the client 211 shown in FIG. 2.

In FIG. 6, entries of retrieval are inputted into items 601a, 601b, 601c, and 601d, and conditions corresponding to the entries are inputted into items 602a, 602b, 602c, and 602d.

The entries are different depending on the devices. The user selects the attribute information to be retrieved from the entries. The embodiment relates to a printer as shown in FIG. 5. For example, the items 502 to 509 of a retrieval condition 501 are inputted into the items 601a to 601d and their values are inputted into the items 602a to 602d. After the retrieval condition was inputted, the user presses a retrieval start button 603. Although four items can be inputted per screen in the embodiment, all of the items in the retrieval condition 501 can be inputted by a next page button 604.

FIG. 7 shows an example of a retrieval input. In this example, the device in which, as attribute information, the device can be set to "printer", page print designation (N-up) can be set to "4", the jobcopy No. (JOB-COPY) can be set to "10", and the pagecopy No. (page-copy) can be set to "2" is retrieved.

Although not shown in FIG. 7, each item of the retrieval condition can be also set as follows. For example, duplex indicates both-sides, the paper size is set to A4, the resolution is set to 600 dpi, the number of pages is set to 50, and the like. Thus, the device in which the duplex print can be performed, the print can be performed to the paper of the A4 size, and the resolution is equal to 600 dpi is retrieved.

Figures 8, 9:
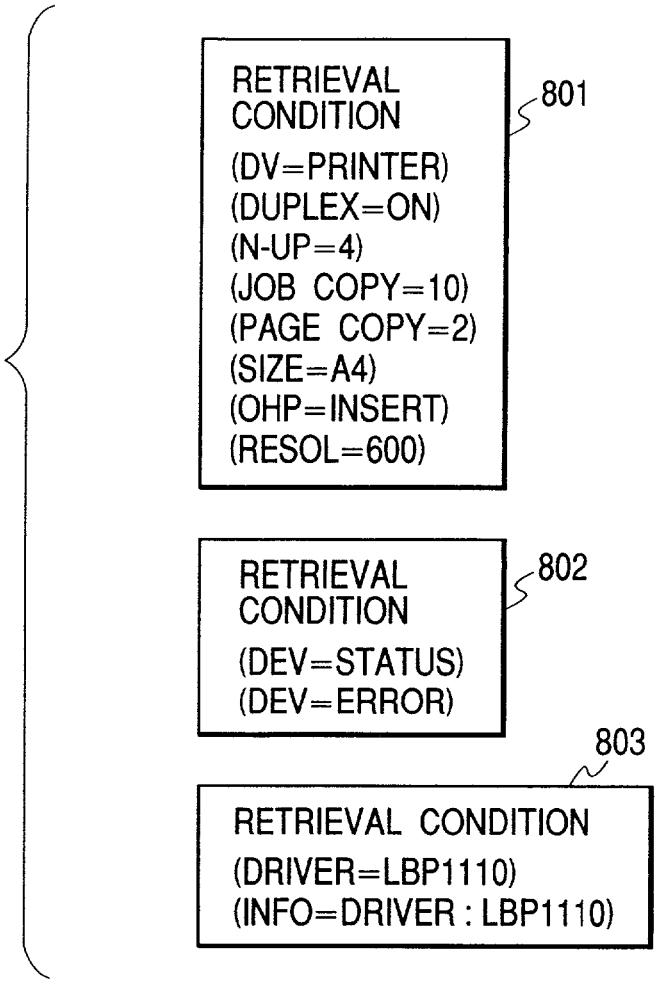
FIG. 8 is a diagram showing an example of a format of data which is sent and received among the server, client, and devices shown in FIG. 2.
FIG. 9 is a diagram showing an example of ability information of the device which is managed by the server shown in FIG. 2.

FIG. 8 is a diagram showing an example of a format of data which is sent and received among the server 210, client 211, and devices 213 to 215 shown in FIG. 2.

In the diagram, reference numeral 801 denotes an example of a format for allowing the client 211 to inquire of the server 210 about the retrieval condition shown in FIG. 7. When the data is transferred from the client 211 to the server 210, the retrieval is performed. The format 801 in FIG. 8 corresponds to a case where the device DV is "printer", the duplex print is "ON (duplex is designated)", the N-up print is "4-page print", JOBcopy is "10", Pagecopy is "2", the paper size is "A4", and the OHP insertion mode resolution is "600 dpi".

Reference numeral 802 denotes an example of a format for allowing the client 211 to obtain the device information from the server 210. The data is transferred from the client 211 to the server 210. For example, Dev=status indicates that the statuses of the devices 213 to 215 are requested. In response to this request, the server 210 returns the status such as ready, off-line, printing, or the like of each device. Dev=error indicates a conformation request to discriminate whether the device is in an error status or not. In response to this request, the server 210 returns factors of errors.

Reference numeral 803 shows an example of a format for allowing the devices 213 to 215 to identify the presence or absence of the device driver and the ability information to the server 210 and client 211. The data is transferred from the device to the server 210 or from the device to the client 211. Driver=LBP1110 is used for asking the presence or absence of the driver of the LBP 1110. Info=driverLBP1110 is used for requesting for the ability information of the device driver of the LBP 1110.

FIG. 9 is a diagram showing an example of ability information of a certain device which is managed by the server 210 shown in FIG. 2.

In the diagram, ability information has been set for each of items 1101 to 1107. Each item shows as follows. That is, as an item 1101, duplex is "available". As an item 1102, N-up print is "unavailable". As an item 1103, JOBcopy is available to "10". As an item 1104, Pagecopy is available to "999". As an item 1105, paper size is "only A4". As an item 1106, OHP insertion is "unavailable". As an item 1107, resolution is "both 600/300 dpi are available".

FIG. 10 is a diagram showing ability information of a certain device driver which is managed by the server 210 shown in FIG. 2. The same component elements as those in FIG. 9 are designated by the same reference numerals.

In the diagram, ability information has been set for each of the items 1101 to 1107. For example, as an item 1101, duplex is "unavailable". As an item 1102, N-up print is "available". As an item 1103, JOBcopy is "available". As an item 1104, Pagecopy is "available". As an item 1105, paper size is "only A4". As an item 1106, OHP insertion is "available". As an item 1107, resolution is "both 600/300 dpi are available".

FIG. 11 is a diagram showing ability information in which the ability information possessed by a certain device and the ability information of the device driver of such a device are combined. The ability information in FIG. 11 is based on the ability information in FIG. 9 and the ability information in FIG. 10. The ability information in FIG. 11 is managed in the ability information table 15.

In the diagram, the ability information has been set for each of the items 1101 to 1108. As an item 1101, duplex print is "available". As an item 1102, N-up print is "available" by the driver. As an item 1103, JOBcopy is available to "10" by the device. As an item 1104, Pagecopy is available to "999". As an item 1105, paper size is "only A4". As an item 1106, OHP insertion is "available" by the driver. As an item 1107, resolution is "both 600/300 dpi are available". As an item 1108, error is "no".

FIG. 12 is a diagram showing an example of a format indicative of adaptivity results which are sent from the server 210 to the client 211 shown in FIG. 2. The diagram shows a format indicative of the adaptivity results which are sent from the server 210 to the client 211 as a result of the retrieval. The data indicates the adaptivity in a certain device and is transferred from the server 210 to the client 211.

In the diagram, reference numeral 1201 denotes an adaptivity and 1202 denotes extended information (EXTEND). Driver correspondence items, error information which is presumed, or the device status is stored in the EXTEND. Reference numeral 1203 denotes a type of EXTEND. For example, "D" indicates a driver adaptivity item, "E" shows an inadaptivity item, and "W" shows an error status.

In FIG. 12, a state where all of eight retrieval items are adaptive. A state where the 4-up print and the OHP insertion are executed in accordance with the ability of the device driver is shown.

FIG. 13 is a diagram showing an example of a retrieval result notification screen which is displayed to the client 211 shown in FIG. 2. A case where it is displayed as a bit map to the client 211 as a retrieval result based on the retrieval condition is shown.

In FIG. 13, reference numerals 1301a to 1301c denote names of the devices; 1302a to 1302c indicate adaptivities and extended information (EXTEND) in the devices. The inadaptivity items, error information, or device status is stored in the EXTEND. By this display, the adaptivities of the devices are sequentially displayed in the order from the high adaptivity and the user can understand which device should be selected.

In the embodiment, it will be understood that the adaptivity of the LBP 1110 corresponding to the name 1301a of the device is "100" and there are two driver adaptivity items of the printing function of "4 pages" and "OHP insertion". That is, the 4-up print and the OHP insertion print are possible by using the device driver of the LBP 1110.

In an MFP 6550 corresponding to the name 1301b of the device, the adaptivity is "90" and a fact that the inadaptivity item is "duplex" is shown in the EXTEND. In an LBP 3310 corresponding to the name 1301c of the device, it is shown that the adaptivity is "60" and the occurrence of "jam" is shown in the EXTEND.

The embodiment shows a case where the EXTEND is displayed in the order of error, inadaptivity item, and driver adaptivity item.

The embodiment will now be described in detail hereinbelow with reference to flowcharts shown in FIGS. 15 to 20.

A registering process for registering into the server by the device will be first explained with reference to the flowchart of FIG. 15.

Figure 15:
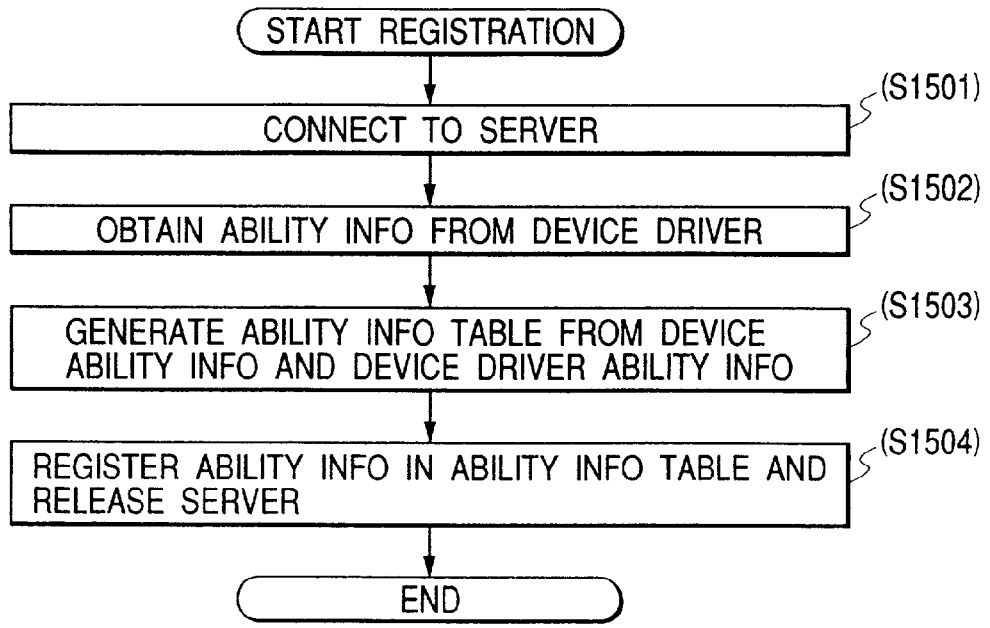
FIG. 15 is a flowchart showing an example of a first data processing procedure in the device according to the invention.

FIG. 15 is the flowchart showing an example of the first data processing procedure in the device according to the invention. A program based on the flowchart has been stored in the HD 1411 or RAM 1404 in FIG. 14 and is executed by the CPU 1402 in FIG. 14. S1501 to S1504 denote processing steps. The color printer 213 (name: LBP1110) shown in FIG. 2 will now be described as an example.

It is assumed that according to the LBP 1110, the non-volatile RAM 1412 as self information holding means in the device holds therein position information, a device name, device type name information, and an IP address (hereinafter, attribute information).

When a power source is turned on, the CPU 1402 of the LBP 1110 connects the LBP to the server 210 (step S1501). After the connection, the LBP 1110 reads out the position information and attribute information from the NVRAM 1412 and sends them to the server 210. The server registers those device information into the manager 11 shown in FIG. 1 in the format as shown in FIG. 4.

Subsequently, the CPU retrieves the device driver and if the driver exists in the device, the ability information is obtained from the device driver in the device (step S1502). The device driver is subsequently retrieved and if it does not exist in the device, the CPU communicates with the device driver in the server 210 or client 211 by using a format 803, thereby obtaining the ability information (refer to FIG. 10) of the device driver. Further, the ability information table shown in FIG. 11 is generated by obtaining the sum of the ability information of the device and the ability information of the device driver (step S1503).

The device itself has obtained the sum of the ability information of the device and the ability information of the device driver here. However, it is also possible to construct the system in a manner such that the device sends the ability information of the device and the ability information of the device driver to the server 210 and the server 210 obtains the sum of the ability information of the device and the ability information of the device driver and registers the sum into the ability information table 15.

After the generated ability information table is sent to the server 210, the CPU 1402 of the LBP 1110 releases the connection to the server 210 (step S1504) and finishes the processes.

The ability information table is managed by the manager 11 and referred to by the retrieval unit 12. In the embodiment, the server 210 also adds the status of the device to the information obtained from the device, thereby generating the ability information table 15. By executing such a procedure, each device registers the position information, attribute information, and ability information table into the server 210 after the power-on. Naturally, a procedure similar to that mentioned above is also executed in the case where the updating of the device driver occurs.

Subsequently, processes of the server 210 will be described with reference to the flowchart of FIG. 16.

Figure 16:
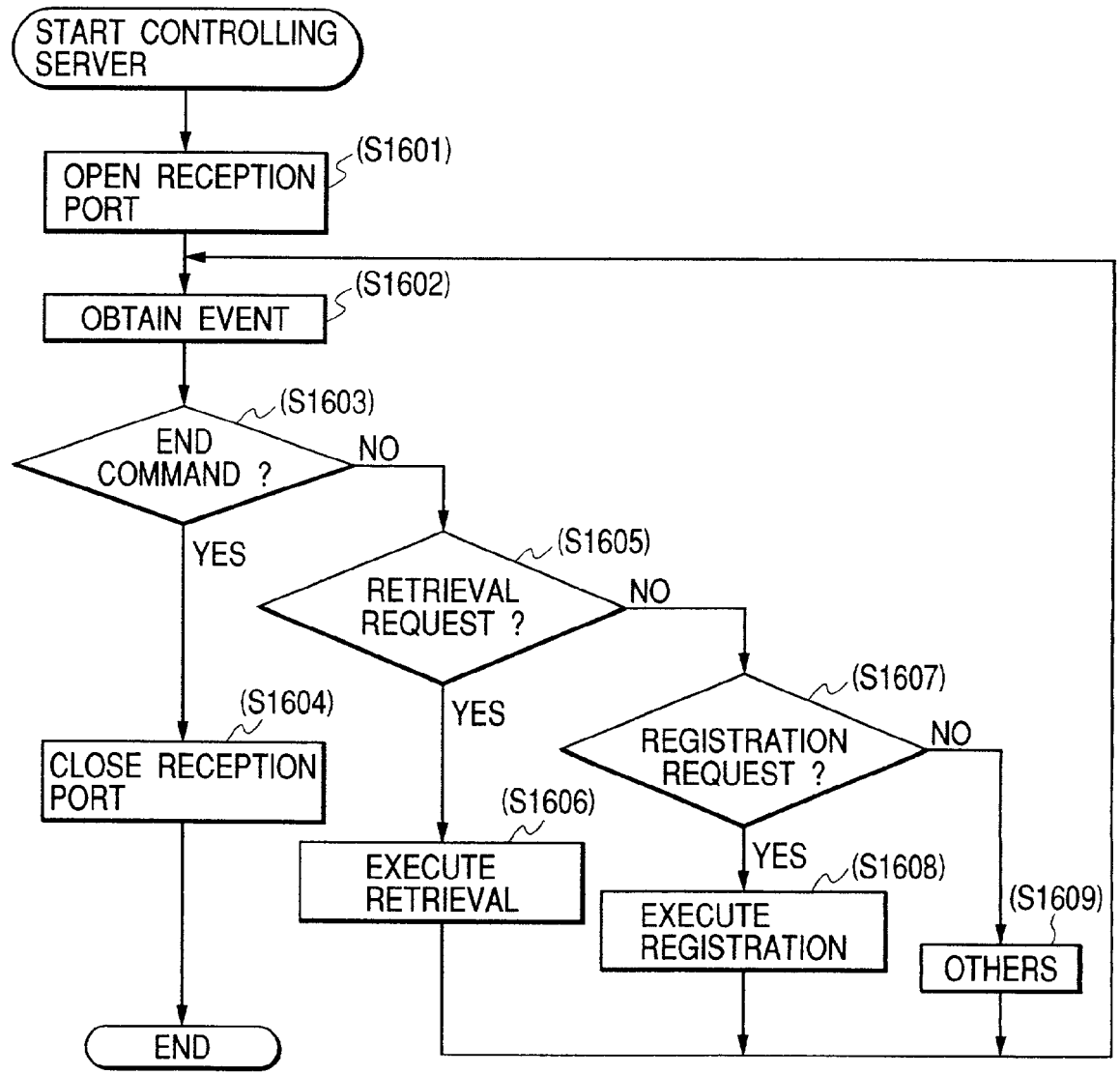
FIG. 16 is a flowchart showing an example of a first data processing procedure in the server according to the invention.

FIG. 16 is the flowchart showing an example of the first data processing procedure in the server according to the invention. A program based on this flowchart has been stored in the HD 311 or RAM 304 in FIG. 3 and is executed by the CPU 302 in FIG. 3. S1601 to S1609 denote processing steps.

The server 210 is constructed by an event driving type program. When an event is generated, the server analyzes the event and executes processes corresponding thereto.

When the power source is turned on or the event is generated, the server 210 first opens a reception port (step S1601). Subsequently, the server obtains the event (step S1602) and discriminates whether the obtained event is an end command or not (step S1603). As a result of the discrimination, if it is determined that the obtained event is the end command, the reception port is closed (step S1604).

If it is decided that the obtained event is not the end command as a result of the discrimination in step S1603, whether it is a retrieval request or not is discriminated (step S1605). If it is determined that the received event is the retrieval request, a retrieval process is performed in step S1606 and the processing routine is returned to step S1602.

If it is decided that the obtained event is not the retrieval request as a result of the discrimination in step S1605, whether the obtained event is a registration request for registering the data into the database or not is discriminated in step S1607. If it is determined that the event is the registration request as a result of the discrimination, the received data is registered into a table 400 shown in FIG. 4 (step S1608).

The table 400 in which the received data has been registered is held in the HD in the server 210. In case of registering the ability information, the table is held in the HD 311 and managed by the ability information table 15.

Also in case of registering the device driver, the table is held in the HD 311 and managed by the device driver storage 16.

If it is determined that the event is another request as a result of the discrimination in step S1607, other processes are executed (step S1609) and the processes are finished.

As other processes, there are an inquiry about a location of the device driver and an inquiry about the ability information of the device driver.

Figure 17:
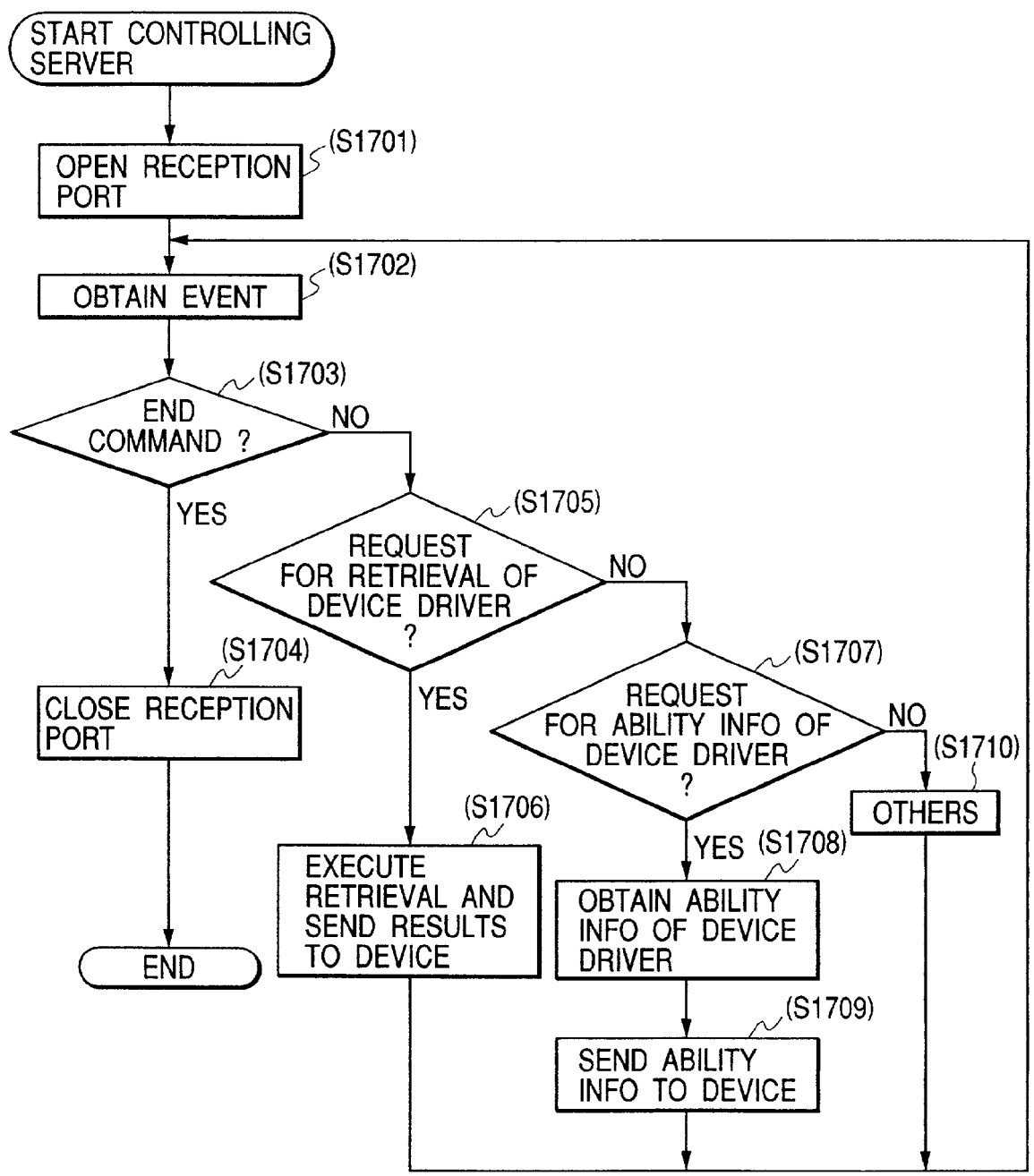
FIG. 17 is a flowchart showing an example of a second data processing procedure in the server according to the invention.

FIG. 17 is the flowchart showing an example of the second data processing procedure in the server according to the invention. A program based on the flowchart has been stored in the HD 311 or RAM 304 in FIG. 3 and is executed by the CPU 302 in FIG. 3. S1701 to S1710 denote processing steps. As described in FIG. 16, the server 210 is constructed by an event driving type program. When an event is generated, the server analyzes the event and executes processes corresponding thereto.

When the power source is turned on or when an event is generated, the server 210 first opens the reception port (step S1701). Subsequently, the server obtains the event (step S1702) and discriminates whether the obtained event is the end command or not (step S1703). If it is determined that the obtained event is the end command as a result of the discrimination, the server closes the reception port (step S1704) and finishes the processes.

If it is decided that the event is not the end command as a result of the discrimination in step S1703, whether the event is the retrieval request for retrieving the device driver or not is discriminated (step S1705). If it is determined that the event is the retrieval request, the retrieval process is executed in the device driver registered from the device driver storage 16 in step S1706 and a result of the retrieval process is sent to the device 30. The processes are finished.

If it is determined in step S1705 that the event is not the retrieval request of the device driver, whether the event is the ability information request of the device driver or not is discriminated in step S1707. If it is decided that the event is the ability information request, the ability information of the device driver (refer to FIG. 10) is obtained from the device driver storage 16 in step S1708. In step S1709, the obtained ability information is sent to the device (for example, device 30) on the requesting source side. The processes are finished.

If it is determined in step S1707 that the event is not the ability information request, processes corresponding to the request are executed as other processes in step S1710. The processes are finished.

The retrieval process in step S1606 which is executed by the server 210 will be described in detail with reference to FIG. 18.

Figure 18:
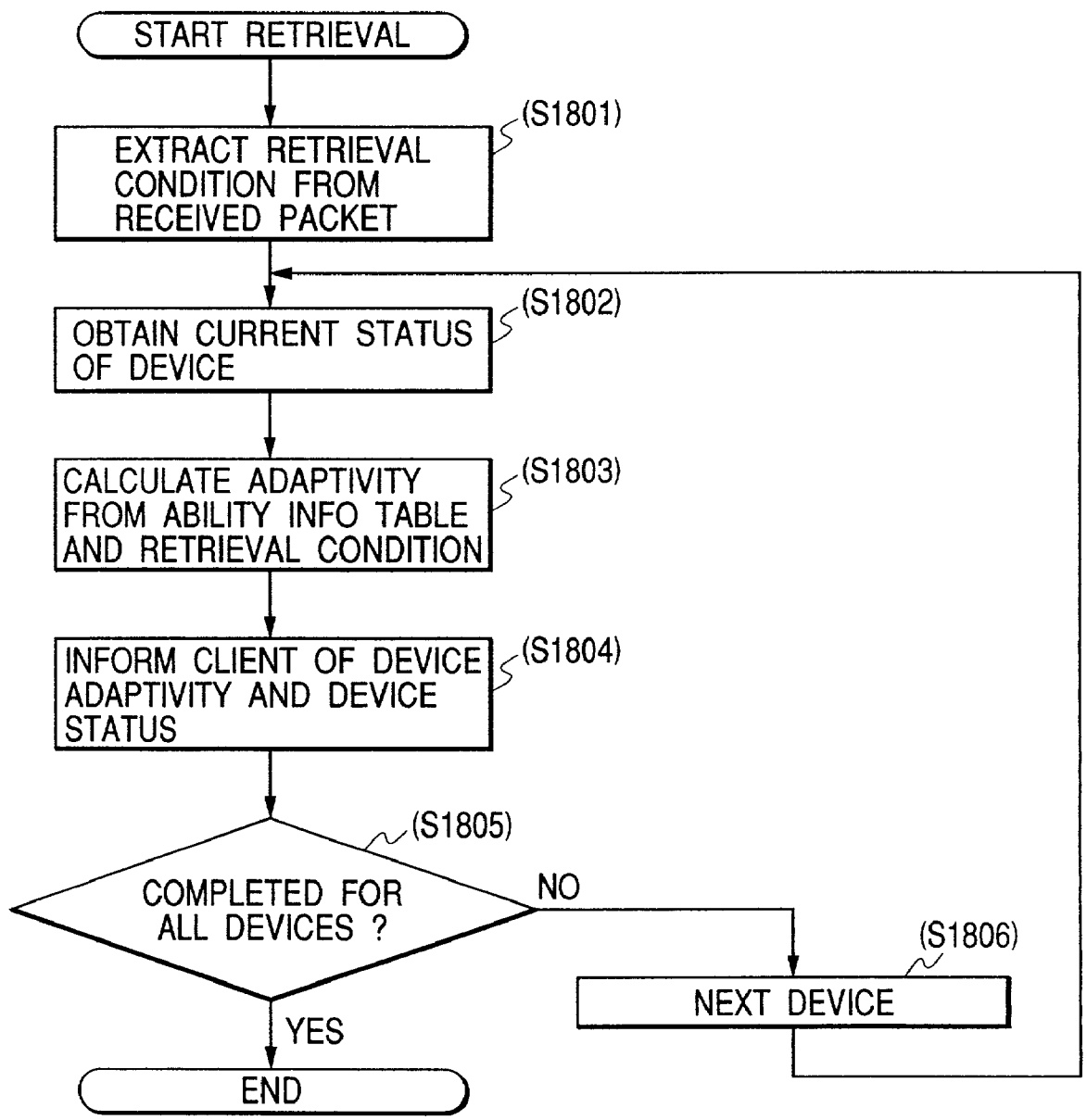
FIG. 18 is a flowchart showing an example of a third data processing procedure in the server according to the invention.

FIG. 18 is a flowchart showing an example of the third data processing procedure in the server according to the invention. A program based on the flowchart has been stored in the HD 311 or RAM 304 in FIG. 3 and is executed by the CPU 302 in FIG. 3. S1801 to S1806 denote processing steps.

In the retrieval process, the retrieval condition set by the client is extracted from a received packet in step S1801. In step S1802, by sending data in the format 802 shown in FIG. 8 to the device 30, the current status of the device is obtained and stored into the ability information table 15. In the embodiment, the device status and error status correspond.

Subsequently, in step S1803, the ability information table 15 is compared with the retrieval condition, thereby obtaining an adaptivity. For example, adaptivity results of the items shown in FIG. 8 and the LBP 1110 will now be described.

The LBP 1110 has the ability shown in FIG. 9. The device driver of the LBP 1110 has the ability shown in FIG. 10. The sum of both abilities is stored into the ability information table shown in FIG. 11. In step S1802, the current status of the device is also updated.

When comparing with respect to the items of the retrieval condition shown in FIG. 8, DV=printer is "adaptive" with reference to the information 403 shown in FIG. 4, duplex=ON is "available" with reference to the item 1101, N-up is "available by the driver" with reference to the item 1102, JOBcopy is "available" because it is available to "10" by the device with reference to the item 1103, Pagecopy is "available" to "999" for "2" with reference to the item 1104, size is "available" because it is "A4" with reference to the item 1105, OHP=insert is "available by the driver" with reference to the item 1106, and resolution is "available" because "both 300/ 600 dpi are available" with reference to the item 1107, respectively.

It will be understood that status is "usable status" because error is "NO" by confirming whether the status is "ready" or not with reference to the item 1108.

The client 20 is notified of the adaptivity of the device and the device status by using the format shown in FIG. 12 in step S1804 shown in FIG. 18. Since eight items coincide with the eight items requested from the client 20, the adaptivity is set to "100"% and stored into the adaptivity 1201 shown in FIG. 12. The adaptivity item "4-page print" by the driver, and the OHP insertion are inputted into the extended information (EXTEND) 1202. As a type of EXTEND 1203, "D" as a device driver adaptivity item is inputted.

When a jam occurs, "jam" is stored into the extended information (EXTEND) 1202.

Whether the adaptivity results of all devices have been obtained or not is discriminated in step S1805. If it is determined that all of the adaptivity results are not obtained yet, the information of the next device is extracted from the table in FIG. 4 in step S1806. The processing routine is returned to step S1802. If the adaptivity results of all of the devices are obtained, that is, the transmission of them to all devices is completed, the processes are finished.

Subsequently, the whole operation in the client 211 will be described.

Figure 19:
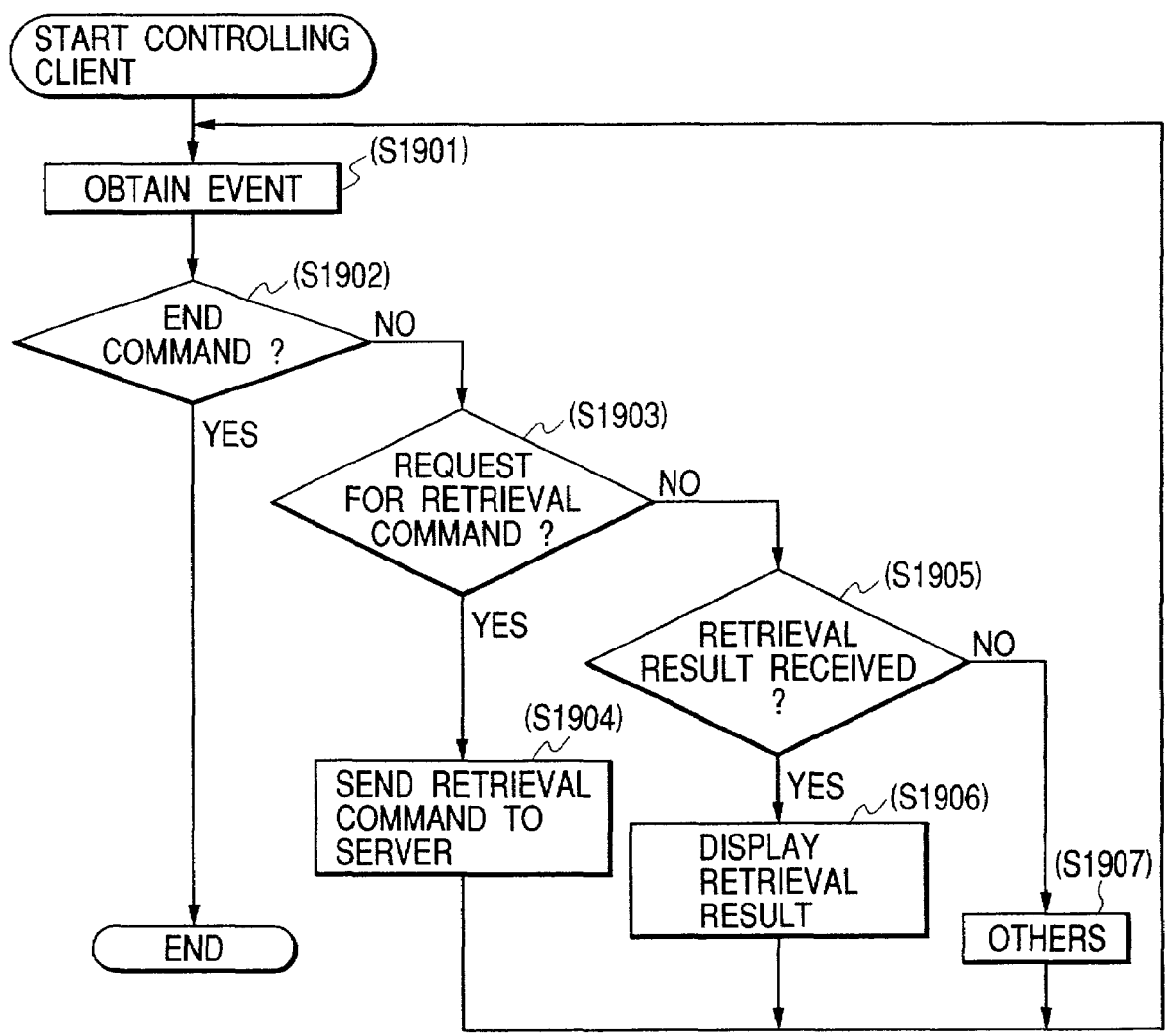
FIG. 19 is a flowchart showing an example of a first data processing procedure in the client according to the invention.

FIG. 19 is a flowchart showing an example of the first data processing procedure in the client 211 according to the invention. A program based on the flowchart has been stored in the HD 311 or RAM 304 in FIG. 3 and is executed by the CPU 302 in FIG. 3. S1901 to S1907 denote processing steps. The client 211 is constructed by an event driving type program. When an event is generated, the client analyzes the event and executes processes corresponding thereto.

As shown in the flowchart of FIG. 19, the client 211 obtains the event in first step S1901. When the event of the end command is received in step S1902, the processes are finished as they are.

If it is determined in step S1902 that the event is not the end command, for example, the client 211 inputs the retrieval condition from the user with reference to the retrieval condition input screen as shown in FIG. 7. The event is generated when the user clicks a retrieval start button 703.

If it is determined in step S1903 that the event is a request for issuing the retrieval command as mentioned above, the client 211 sends the retrieval request to the server 210 (step S1904).

In this instance, the server 210 is inquired on the basis of the retrieval condition shown in FIG. 8. By storing the retrieval condition onto the HD 311, a reinput of the retrieval condition from the user can be omitted by using the retrieval condition at the time of the next retrieval.

If it is decided in step S1903 that the event is not the retrieval command issuance, the client 211 waits for the retrieval result from the server 210. When the event is received, whether the retrieval result has been received or not is discriminated in step S1905. If it is decided that the retrieval result has been received, for example, when the adaptivity results as shown in FIG. 12 are received, a process for displaying the adaptivity results is executed (step S1906). The processing routine is returned to step S1901.

If it is determined in step S1905 that no retrieval result is received, other processes are executed for other events (step S1907). The processing routine is returned to step S1901.

Although there are the retrieval request of the device driver and the ability information request of the device driver as other events, the processes shown in FIG. 17 corresponding to those requests are executed in a manner similar to those for the server. Naturally, the server 210 is replaced with the client 211.

The operation of the device 213 will now be described in detail with reference to a flowchart of FIG. 20.

Figure 20:
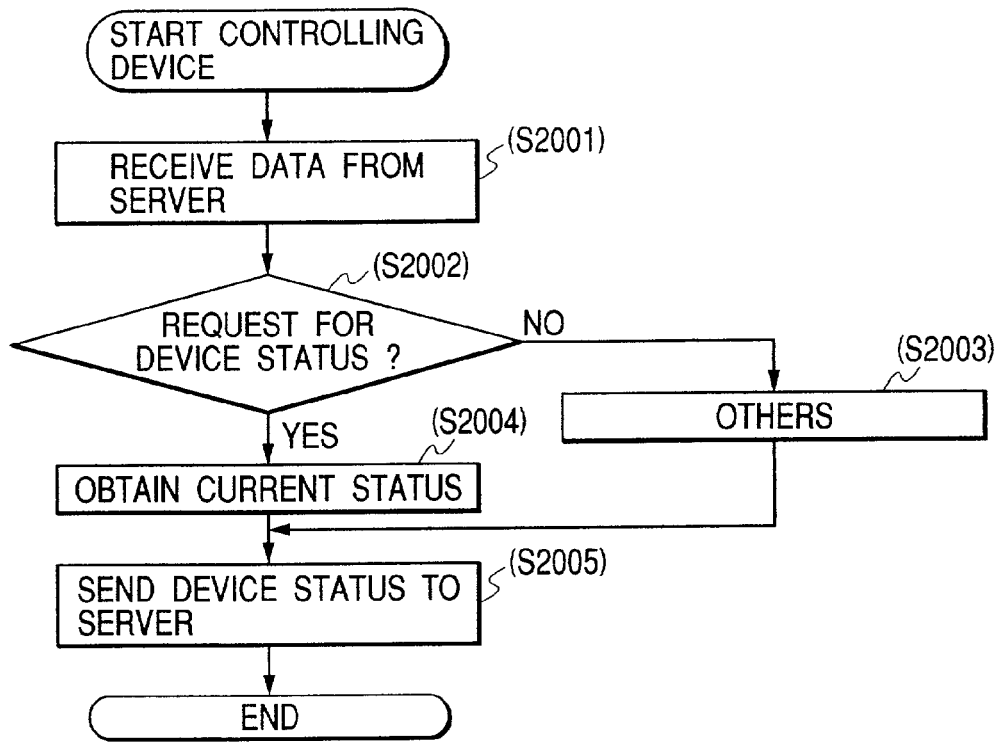
FIG. 20 is a flowchart showing an example of a second data processing procedure in the device according to the invention.

FIG. 20 is the flowchart showing an example of the second data processing procedure in the device according to the invention. A program based on the flowchart has been stored in the HD 1411 or RAM 1404 in FIG. 14 and is executed by the CPU 1402 in FIG. 14. S2001 to S2005 denote processing steps.

First, the data is received from the server 210 in step S2001. In step S2002, the data is analyzed and whether it is a request command for the current device status (retrieval condition 802 shown in FIG. 8) or not is discriminated. If NO, processes corresponding to the command are executed in step S2003 and step S2005 follows.

If it is decided in step S2002 that the data is a request command for the device status, the information according to the item of the request command is obtained in step S2004. Specifically speaking, the error information and the device status (printing, offline, etc.) are obtained.

Subsequently, the device status is sent to the server 210 in step S2005 and the processes are finished.

Figure 21:
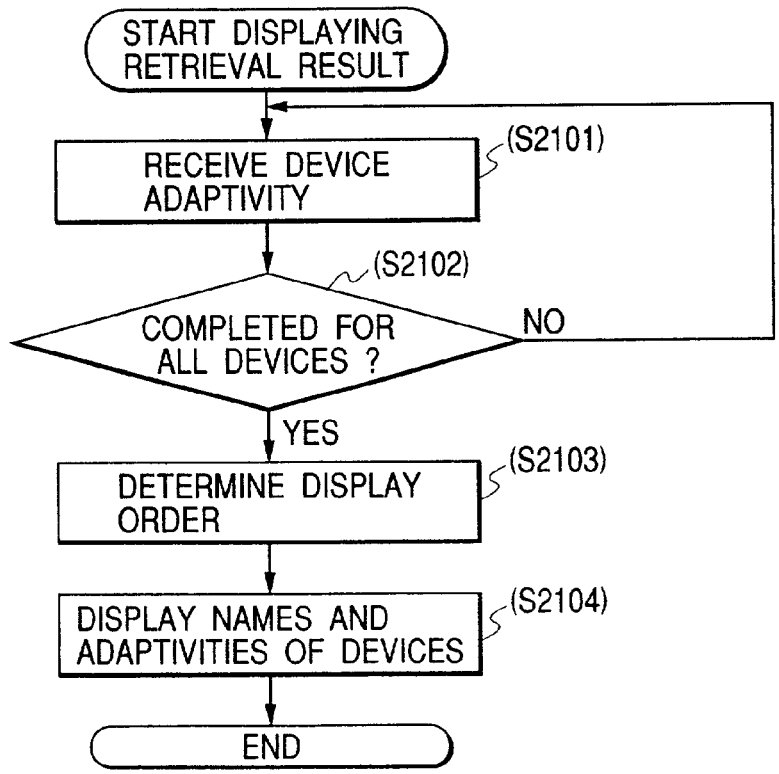
FIG. 21 is a flowchart showing an example of a second data processing procedure in the client according to the invention.

A process for displaying the retrieval results of the client 211 will be finally explained further in detail with reference to a flowchart of FIG. 21.

FIG. 21 is a flowchart showing an example of the second data processing procedure in the client according to the invention. A program based on the flowchart has been stored in the HD 311 or RAM 304 in FIG. 3 and is executed by the CPU 302 in FIG. 3. S2101 to S2104 denote processing steps.

In first step S2101, the adaptivity results of the devices which are sent from the server 210 are received. The adaptivity results are as shown in FIG. 13.

In next step S2102, whether the processes of the adaptivity results of all devices have been completed or not is discriminated. If it is determined that they are not yet completed as a result of the discrimination, the processing routine is returned to step S2101 and the adaptivities are received.

In step S2102, if it is decided that all processes have been finished, step S2103 follows. The received adaptivity results are sorted in the order from the high adaptivity, thereby deciding the display order. In step S2104, the device names 1301a to 1301c for the devices are displayed with reference to the information 401, the adaptivities, the items serving as extended information 1302a to 1302c, and the other information are displayed for all devices.

The device control program on the network according to the invention described above can be executed by a personal computer in accordance with a program which is installed from the outside. In this case, the invention is also applied to a case where the program is obtained from a memory medium such as CD-ROM, flash memory, floppy disk, or the like or an information group including the program is loaded onto the personal computer from an external memory medium through a network such as Email, personal computer communication, or the like, so that the program is supplied to the personal computer.

Figure 22:
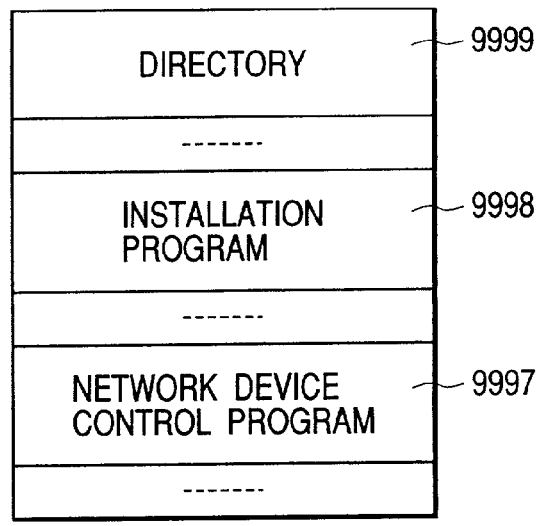
FIG. 22 is a diagram for explaining a memory map of a memory medium for storing various control programs according to the invention.

FIG. 22 is a diagram for explaining a memory map of a memory medium for storing various control programs according to the invention and shows a case where the memory medium is, for example, a CD-ROM.

In FIG. 22, reference numeral 9999 denotes an area in which directory information has been stored. The directory information indicates a location of a subsequent area 9998 in which an installation program has been stored and a location of an area 9997 in which the network device control program has been stored.

When the network device control program of the invention is installed into the personal computer such as a client 211 or the like, first, the installation program stored in the area 9998 is loaded into the system and executed by the CPU of the personal computer.

Subsequently, the installation program which is executed by the CPU of the personal computer reads out the network device control program from the area 9997 in which the network device control program has been stored and stores it onto the hard disk in the personal computer.

As described above, by combining the ability of the device and the ability of the device driver, the ability of the device can be raised and the advanced function can be provided to the user.

Naturally, after the user selected the devices, the devices which are displayed so that they can be realized by the device drivers need to be set by the device drivers.

OTHER EMBODIMENTS

Although the embodiment has been described with respect to the case where the selecting reference of the device drivers has been set to the order from the server, the device driver can be also selected from the latest client or the latest device driver. When the updating of the device driver occurs, by executing the present process, the ability information of the latest device driver can be also reflected.

A processing procedure for retrieving a new device driver will now be described with reference to a flowchart of FIG. 23.

Figure 23:
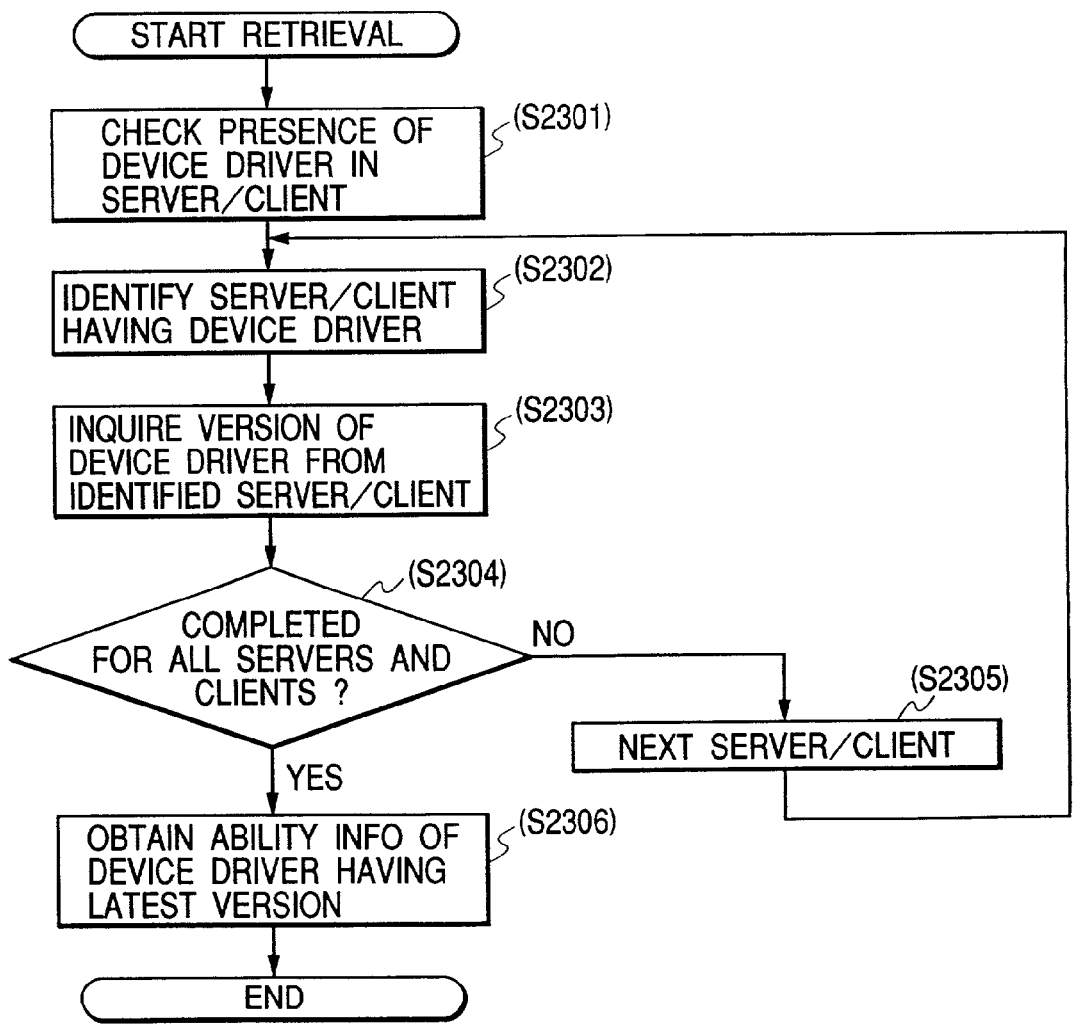
FIG. 23 is a flowchart showing an example of a device driver retrieval processing procedure in the server and a client terminal apparatus according to the invention.

FIG. 23 is the flowchart showing an example of a device driver retrieval processing procedure in the server and client according to the invention. S2301 to S2306 denote processing steps.

It is assumed that the present process is started in the case where the device is connected to the network or the case where the device driver is updated.

First, in step S2301, the presence or absence of the device driver in the server and client on the network is identified by using the driver command in the data 803 shown in FIG. 8.

In next step S2302, the server or client having the device driver is identified. In step S2303, versions of the device drivers are sequentially inquired from the relevant terminals.

In step S2304, whether the inquiry processes for all terminals have been completed or not is discriminated. If NO, the next terminal is selected in step S2305.

If the processes for all terminals are finished in step S2304, the ability information of the device driver is inquired from the terminal having the latest device driver and the ability information is obtained in step S2306. The processes are finished.

According to the embodiment, by combining the abilities of the device and the device driver and registering the combined ability information into the server, the adaptivity of the retrieval condition which is sent from the client can be raised. Thus, the result in which the selecting range of the device has been widened and the adaptivity to the retrieval condition has been raised can be provided to the user.

A construction of a data processing program which can be read out by the network system including the server, client, devices, and the like according to the invention will now be described hereinbelow with reference to a memory map shown in FIG. 24.

FIG. 24 is a diagram for explaining the memory map in a memory medium for storing various data processing programs which can be read out by the network system including the server, client, devices, and the like according to the invention.

Although not shown, there is also a case where information for managing the programs which are stored in the memory medium, for example, version information, implementor, and the like are also stored and information which depends on the OS or the like on the program reading side, for example, icons or the like for identifying and displaying the programs are also stored.

Further, data which depends on the various programs is also managed in the directory. There is also a case where a program for installing various programs into a computer and, if the installation program has been compressed, a decompressing program or the like are also stored.

The functions shown in FIGS. 15 to 21 and 23 in the embodiment can be also executed by a host computer in accordance with a program which is installed from the outside. In this case, the invention is also applied to a case where an information group including the program is supplied to an output apparatus from a memory medium such as CD-ROM, flash memory, FD, or the like or from an external memory medium through the network.

The objects of the invention are also obviously accomplished by a method whereby a memory medium in which program codes of software for realizing the functions of the foregoing embodiments have been recorded as mentioned above is supplied to a system or an apparatus, and a computer (or a CPU or an MPU) of the system or apparatus reads out and executes the program codes stored in the memory medium.

In this case, the program codes themselves read out from the memory medium realize the novel functions of the invention and the memory medium in which the program codes have been stored constructs the invention.

As a memory medium for supplying the program codes, for example, it is possible to use a floppy disk, a hard disk, an optical disk, a magnetooptic disk, a CD-ROM, a CD-R, a magnetic tape, a non-volatile memory card, an ROM, an EEPROM, or the like.

The invention incorporates not only a case where the computer executes the read-out program codes, so that the functions of the foregoing embodiments are realized but also a case where on the basis of instructions of the program codes, the OS (Operating System) or the like which operates on the computer executes a part or all of the actual processes, and the functions of the foregoing embodiments are realized by those processes.

Further, the invention also incorporates a case where the program codes read out from the memory medium are written into a memory equipped for a function expanding board inserted into a computer or a function expanding unit connected to a computer and, thereafter, a CPU or the like equipped for the function expanding board or function expanding unit executes a part or all of the actual processes on the basis of instructions of the program codes, and the functions of the foregoing embodiments are realized by those processes.

As described above, according to the above embodiments, by combining the ability information of each device connected to the network and the ability information of the device drivers and registering the combined ability information as an ability of the device into the server, the adaptivities of the selectable devices according to the device retrieval condition from the client are presented to the user, so that there are effects such that the selecting range of the devices which can be selected in the whole system by the user is widened and the desired devices can be freely selected from a plurality of devices which conform with the retrieval condition.

What is claimed is:

1. A server communicating with a device, comprising:
    a first storage unit storing information representing an ability of the device;
    a second storage unit storing information representing an ability of a device driver for the device;
    a retrieval condition reception unit receiving from a user a retrieval condition, including at least one ability, for selecting the device;
    a comparing unit comparing the retrieval condition received by said retrieval condition reception unit with combined information, the combined information being a combination of the information stored by said first storage unit and the information stored by said second storage unit; and
    an output unit outputting a result of comparing by said comparing unit,
    wherein said output unit outputs information for identifying, among the at least one ability included in the retrieval condition, an ability which does not conform to any ability of the device stored in the first storage unit but conforms to at least one ability of the device driver stored in the second storage unit.

2. A server according to claim 1, further comprising:
    a first reception unit receiving the information representing the ability of the device; and
    a second reception unit receiving the information representing the ability of the device driver for the device.

3. A server according to claim 1, further comprising a generation unit generating the combined information by combining the information stored by said first storage unit and the information stored by said second storage unit together.

4. A server according to claim 3, further comprising a third storage unit storing the combined information generated by said generation unit.

5. A server according to claim 4, wherein said comparing unit compares the combined information stored by said third storage unit with the retrieval condition.

6. A server according to claim 1, wherein said output unit outputs an adaptivity based on the number of adapted abilities among the at least one ability included in the retrieval condition.

7. A server according to claim 1, wherein the information representing the ability of the device is information concerning any one of duplex print, N-up print, jobcopy, pagecopy, OHP insertion print, resolution, the number of print pages, a paper size, and a status of the device.

8. A server according to claim 1, wherein the comparing by said comparing unit is performed with respect to plural devices.

9. A server according to claim 1, wherein the at least one ability included in the search condition is information concerning any one of duplex print, N-up print, jobcopy, pagecopy, OHP insertion print, resolution, the number of print pages, and paper size.

10. An information processing method which is executed by a server communicating with a device, comprising the steps of:
    storing first information representing an ability of the device;
    storing second information representing ability of a device driver for the device;
    receiving from a user a retrieval condition, including at least one ability for selecting the device;
    comparing the retrieval condition received in said retrieving step with combined information, the combined information being a combination of the first information and the second information; and
    outputting a result of comparing in said comparing step,
    wherein outputting step includes outputting information for identifying, among the at least one ability included in the retrieval condition, an ability which does not conform to any ability of the device stored in the first storage unit but conforms to at least one ability of the device driver stored in the second storage unit.

11. A method according to claim 10, further comprising the steps of:
    receiving the first information representing the ability of the device; and
    receiving the second information representing the ability of the device driver for the device.

12. A method according to claim 10, further comprising the step of generating the combined information by combining the first and the second information together.

13. A method according to claim 12, further comprising the step of storing the combined information generated in said generating step in a storage unit.

14. A method according to claim 13, wherein said comparing step includes comparing the combined information with the retrieval condition.

15. A method according to claim 10, wherein said outputting step includes outputting an adaptivity based on the number of adapted abilities among the at least one ability included in the retrieval condition.

16. A method according to claim 10, wherein the first information representing the ability of the device is information concerning any one of duplex print, N-up print, jobcopy, pagecopy, OHP insertion print, resolution, the number of print pages, a paper size, and a status of the device.

17. A method according to claim 10, wherein the comparing in said comparing step is performed with respect to plural devices.

18. A method according to claim 10, wherein the at least one ability included in the search condition is information concerning any one of duplex print, N-up print, jobcopy, pagecopy, OHP insertion print, resolution, the number of print pages, and paper size.

19. A computer-readable medium storing an information processing program, which is executed by a server communicating with a device, wherein said program causes a computer to execute:
    a first storing step of storing first information representing an ability of the device;
    a second storing step of storing second information representing an ability of a device driver for the device;
    a receiving step of receiving from a user a retrieval condition including at least one ability for selecting the device;
    a comparing step of comparing the retrieval condition received in said retrieving step with combined information, the combined information being a combination of the first information and the second information; and
    outputting a result of comparing in said comparing step,
    wherein outputting step includes outputting information for identifying, among the at least one ability included in the retrieval condition, an ability which does not conform to any ability of the device stored in the first storage unit but conforms to at least one ability of the device driver stored in the second storage unit.

20. A computer-readable medium according to claim 19, wherein said program causes the computer to execute steps of:

receiving the first information representing the ability of the device; and receiving the second information representing the ability of the device driver for the device.

21. A computer-readable medium according to claim 19, wherein said program causes the computer to execute a step of generating the combined information by combining the first information and the second information together.

22. A computer-readable medium according to claim 21, wherein said program causes the computer to execute a step of storing the combined information generated in said generating step in a storage unit.

23. A computer-readable medium according to claim 22, wherein said comparing step includes comparing the combined information with the retrieval condition.

24. A computer-readable medium according to claim 19, wherein said outputting step includes outputting an adaptivity based on the number of adapted abilities among the at least one ability included in the retrieval condition.

25. A computer-readable medium according to claim 19, wherein the first information representing the ability of the device is information concerning any one of duplex print, N-up print, jobcopy, pagecopy, OHP insertion print, resolution, the number of print pages, a paper size, and a status of the device.

26. A computer-readable medium according to claim 19, wherein the comparing in said comparing step is performed with respect to plural devices.

27. A computer-readable medium according to claim 19, wherein the at least one ability included in the search condition is information concerning any one of duplex print, N-up print, jobcopy, pagecopy, OHP insertion print, resolution, the number of print pages, and paper size.

* * * * *